(12) United States Patent
Tokyo et al.

(10) Patent No.: US 11,378,656 B2
(45) Date of Patent: Jul. 5, 2022

(54) INFORMATION PROCESSING APPARATUS

(71) Applicant: LENOVO (SINGAPORE) PTE. LTD., Singapore (SG)

(72) Inventors: Asahi Tokyo, Yokohama (JP); Kazuhiro Kosugi, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 317 days.

(21) Appl. No.: 16/876,122

(22) Filed: May 18, 2020

(65) Prior Publication Data
US 2021/0199766 A1    Jul. 1, 2021

(30) Foreign Application Priority Data

Dec. 26, 2019 (JP) .............................. JP2019-236566

(51) Int. Cl.
| | | |
|---|---|---|
| *G01S 7/484* | (2006.01) | |
| *G01S 17/04* | (2020.01) | |
| *G01S 7/481* | (2006.01) | |

(52) U.S. Cl.
CPC .............. *G01S 7/4811* (2013.01); *G01S 17/04* (2020.01)

(58) Field of Classification Search
CPC ..... G01S 7/48; G01S 7/06; G01S 7/02; G01S 7/04; G01S 7/4816; G01S 7/4815; G01S 7/4814; G01S 7/4813; G01S 7/4812; G01S 7/4811; G01S 7/481; G01S 17/931; G01S 17/93; G01S 17/88; G01S 17/04
See application file for complete search history.

(56) References Cited

U.S. PATENT DOCUMENTS

| | | | | |
|---|---|---|---|---|
| 5,359,404 | A * | 10/1994 | Dunne .................... | G01S 17/86 356/28 |
| 8,343,712 | B2 * | 1/2013 | Hamade ................. | B41J 2/1645 430/320 |
| 10,106,155 | B2 * | 10/2018 | Lu .......................... | H04N 5/232 |
| 10,942,299 | B2 * | 3/2021 | Iwasaki ................ | G02B 26/005 |
| 11,126,305 | B2 * | 9/2021 | Xiang ................ | G06V 40/1318 |
| 2012/0265416 | A1 * | 10/2012 | Lu .......................... | G08G 1/168 348/148 |
| 2015/0287532 | A1 * | 10/2015 | Abe ....................... | H05K 3/3436 427/79 |
| 2018/0118612 | A1 * | 5/2018 | Perveiler ................. | C03C 15/00 |
| 2019/0054918 | A1 * | 2/2019 | Lu ....................... | B62D 15/0295 |
| 2019/0187455 | A1 * | 6/2019 | Iwasaki .................... | G02B 3/00 |
| 2019/0217580 | A1 * | 7/2019 | Zhou ....................... | G06F 1/1656 |
| 2020/0285345 | A1 * | 9/2020 | Xiang ........................ | G06F 3/0421 |
| 2021/0199766 | A1 * | 7/2021 | Tokyo ..................... | G01S 7/4811 |
| 2021/0372594 | A1 * | 12/2021 | Lee ..................... | G02F 1/133512 |

FOREIGN PATENT DOCUMENTS

JP          2012119774 A      6/2012

* cited by examiner

*Primary Examiner* — John R Lee
(74) *Attorney, Agent, or Firm* — Shimokaji IP

(57) ABSTRACT

An information processing apparatus includes a display panel, and a ToF sensor emitting light through the display panel, in which the display panel includes a glass, and an AF layer (a water-repellent layer) having water-repellency, formed in an area other than a certain area including a passing area of light emitted from the ToF sensor on a surface of the glass opposite to a surface facing the ToF sensor.

8 Claims, 9 Drawing Sheets

| CONDITIONS ||  EVALUATION RESULTS |
| --- | --- | --- |
| AF LAYER | STAIN | |
| PRESENT | NOT PRESENT | ○ |
| PRESENT | PRESENT | × |
| NOT PRESENT | NOT PRESENT | ○ |
| NOT PRESENT | PRESENT | △ |

FIG. 11

INFORMATION PROCESSING APPARATUS

FIELD OF THE INVENTION

The present invention relates to an information processing apparatus.

BACKGROUND OF THE INVENTION

An information processing apparatus, such as a laptop personal computer (PC), is equipped with a camera for the purpose of detecting a human, taking a picture of a human, and so on (Japanese Unexamined Patent Application Publication No. 2012-119774, for example).

SUMMARY OF THE INVENTION

A ToF (Time of Flight) sensor is attracting attention for the purpose of detecting a user who uses an information processing apparatus, and so on. Although the ToF sensor emits light, the light may not be efficiently emitted due to the influence of a front glass if the ToF sensor is loaded on the information processing apparatus. In addition, when the emitted light is received as well, the light may not be efficiently received due to the influence of the front glass.

The present invention has been made in view of this situation and has an object to provide an information processing apparatus that is capable of more efficiently performing detection by the ToF.

The first aspect of the present invention provides an information processing apparatus including a display panel, and a ToF sensor emitting light through the display panel, in which the display panel includes a transparent member, and a water-repellent layer having water-repellency, formed in an area other than a certain area including a passing area of light emitted from the ToF sensor on a surface of the transparent member opposite to a surface facing the ToF sensor.

The present invention produces an effect that the detection by the ToF can be more efficiently performed.

BRIEF DESCRIPTION OF THE DRAWINGS

FIG. 11 is a diagram illustrating a relationship between an AF layer and a stain.

DETAILED DESCRIPTION OF THE INVENTION

One embodiment of an information processing apparatus 1 according to the present invention will be described below with reference to the drawings. In the present embodiment, the information processing apparatus 1 is described as a laptop PC. However, the information processing apparatus 1 is not limited to the laptop PC, and it may be a desktop PC, or an information processing terminal such as a tablet or a smartphone.

Figure 1:
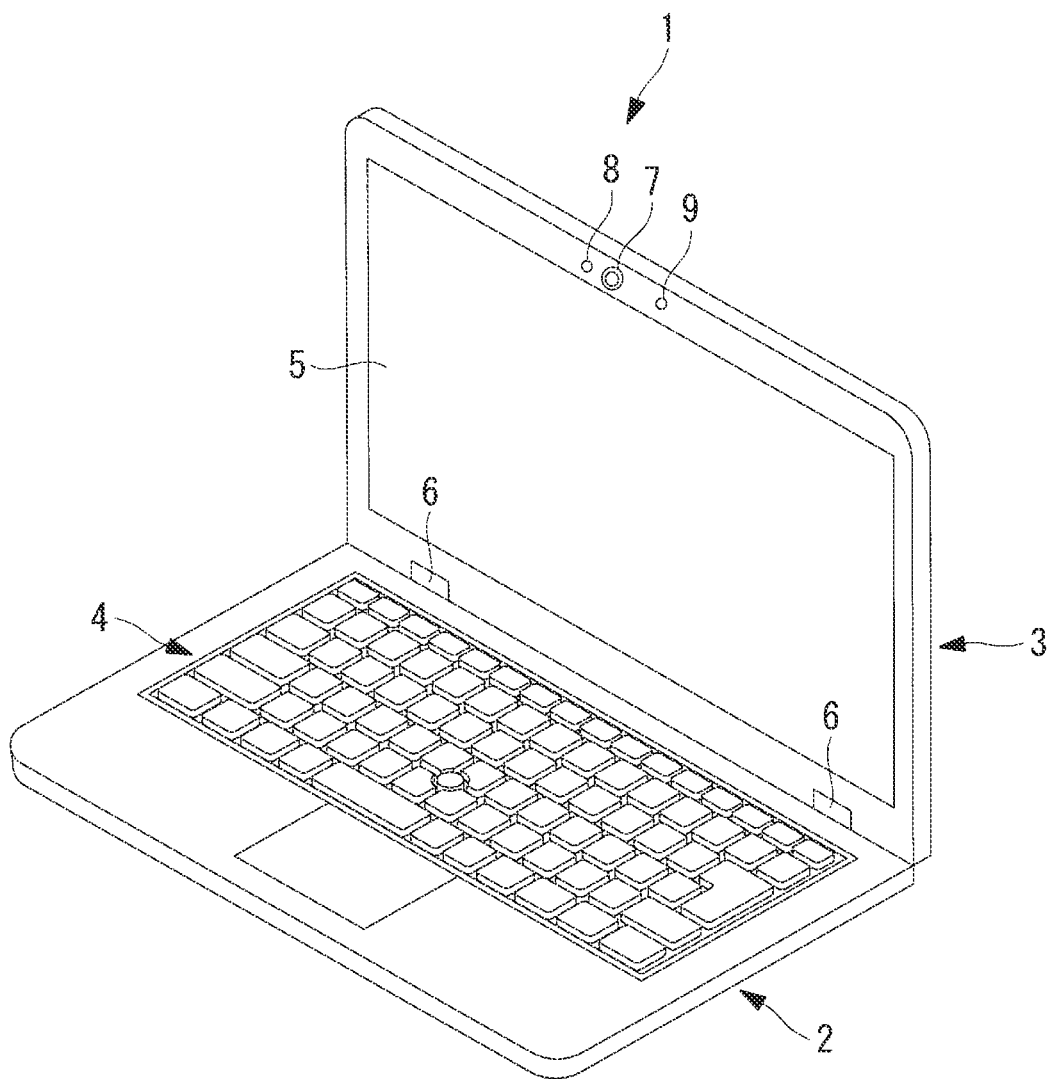
FIG. 1 is a schematic external view of an information processing apparatus according to one embodiment of the present invention.

FIG. 1 is a schematic external view of the information processing apparatus 1 according to one embodiment of the present invention.

As an example, the information processing apparatus 1 includes a main body-side chassis 2 and a display-side chassis 3, both of which have substantially rectangular parallelepiped shapes, as illustrated in FIG. 1.

The main body-side chassis 2 includes an input unit 4. The input unit 4 is a user interface to allow a user to perform input operations, having a keyboard composed of various keys used to enter characters, commands, and the like, a touch pad used to move a cursor on a screen, and select any one of various menus, and the like.

The display-side chassis 3 includes a display unit 5 that displays an image. In the present embodiment, the display unit 5 is an LCD (Liquid Crystal Display), but the display unit 5 is not limited to the LCD. The display unit 5 may be another display device, such as an organic EL (Electroluminescence) display, or a touch panel. The LCD displays, on a display screen, various pieces of information according to inputted display data.

The display-side chassis 3 also includes a camera 7, a light source 8, and a ToF (Time of Flight) sensor 9 (hereinafter referred to as a "sensor") to acquire an image. The camera 7 is disposed substantially at the center of the display-side chassis 3 above the display screen side of the LCD to be able to take an image of a subject in front (a user's face, for example). The light source 8 is disposed substantially at the center of the display-side chassis 3 above the display screen side of the LCD to emit, to the subject in front, auxiliary light involved in shooting with the camera 7. The sensor 9 is disposed substantially at the center of the display-side chassis 3 above the display screen side of the LCD to perform detection by the ToF covering the front of the information processing apparatus 1 as a detection range. The sensor 9 will be mentioned later in detail. The display-side chassis 3 is provided with a front glass (display panel) and the camera 7 and the sensor 9 are provided behind the front glass when viewed from the user (i.e., on the internal side of the information processing apparatus 1).

The main body-side chassis 2 and the display-side chassis 3 are joined in respective end portions by a pair of right and left joining parts 6. The joining parts 6 are hinges to openably and closably support the main body-side chassis 2 and the display-side chassis 3.

Figure 2:
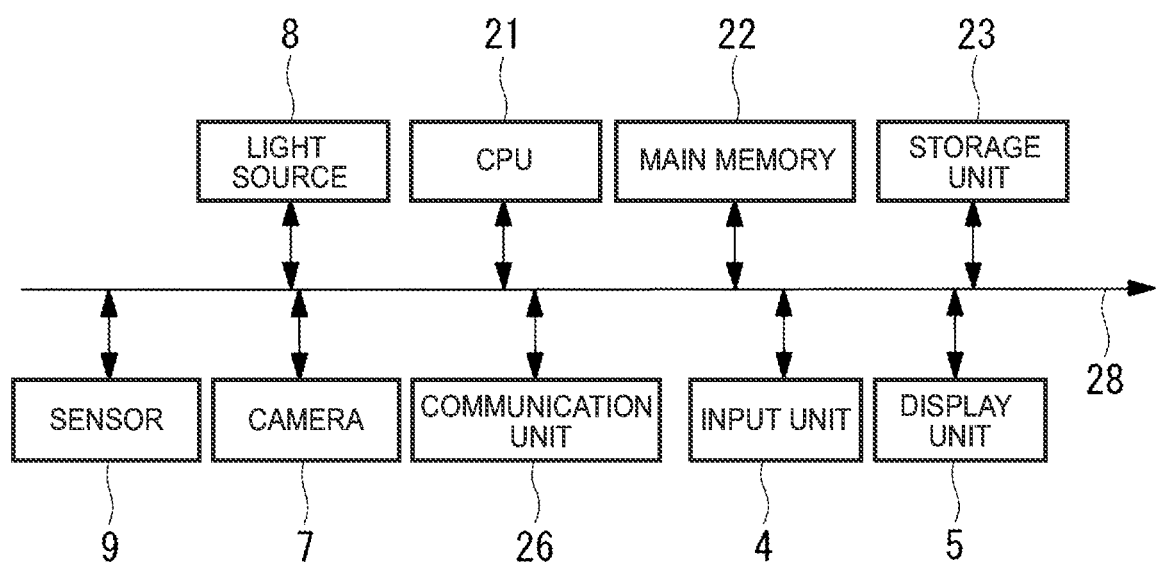
FIG. 2 is a diagram illustrating the hardware configuration of the information processing apparatus according to one embodiment of the present invention.

FIG. 2 is a diagram illustrating a hardware configuration of the information processing apparatus 1 according to one embodiment of the present invention. For example, the information processing apparatus 1 includes a CPU (Central Processing Unit) 21, a main memory 22, a storage unit 23, the display unit 5, the input unit 4, a communication unit 26, the camera 7, the light source 8, and the sensor 9. These units are connected to one another directly or indirectly through a bus 28 to perform various kinds of processing in cooperation with one another.

For example, the CPU 21 controls the entire information processing apparatus 1 under an OS (Operating System) stored in the storage unit 23 connected through the bus 28, and executes various programs stored in the storage unit 23 to execute various kinds of processing.

The main memory 22 is composed of writable memories such as a cache memory and a RAM (Random Access Memory). The main memory 22 is used as a working space to read a program executed by the CPU 21, write data processed by the execution program and so on.

The storage unit 23 is, for example, a ROM (Read Only Memory), an HDD (Hard Disk Drive), a flash memory, an SSD (Solid State Drive), and the like to store the OS, such as Windows (registered trademark), iOS (registered trademark), Android (registered trademark), or the like, to control the entire information processing apparatus 1, various hardware drivers for operating peripheral devices, applications for use in specific business, various data and files, and the like. Further, in the storage unit 23, a program to execute various kinds of processing and various data necessary to execute the various kinds of processing are stored.

The display unit 5 is a display section, for example, the LCD to provide display under the control of the CPU 21.

The input unit 4 includes, for example, a keyboard, a mouse, and the like to be used by a user performing input operations. It is to be noted that a color space related to display processing may be selected by a user using the input unit 4.

The communication unit 26 is an interface to connect to a network so as to communicate with another information processing apparatus 1 in order to exchange information.

The camera 7 is controlled by the CPU 21, for example, based on user's input operations and the like.

The camera (shooting section) 7 is able to shoot and has a lens, a lens driving unit, and an image sensor etc. The lens takes in light from a subject and forms a subject image on the image sensor. The image sensor converts the light taken in by the lens into a signal charge and images the subject image. An image signal from the image sensor is subjected to signal processing (image processing) by an ISP, for example.

The light source 8 emits auxiliary light involved in shooting with the camera 7 and is controlled by the CPU 21.

The sensor 9 measures a distance from an object with ToF technology. Specifically, the sensor 9 measures a distance from the object by measuring time from when it emits light until it receives the emitted light reflected by the object (time from emission to reception), i.e., flight time of light. The emitted light is pulsed light, for example, and an example thereof includes infrared light. The emission of the infrared light permits distinction from ambient light, such as sunlight or illumination light. For example, the sensor 9 is provided above the display unit 5 of the display-side chassis 3, as illustrated in FIG. 1, and emits light toward the front of the information processing apparatus 1 (user side of the information processing apparatus 1) through a glass (front glass) 33 of a display panel DP.

Figure 3:
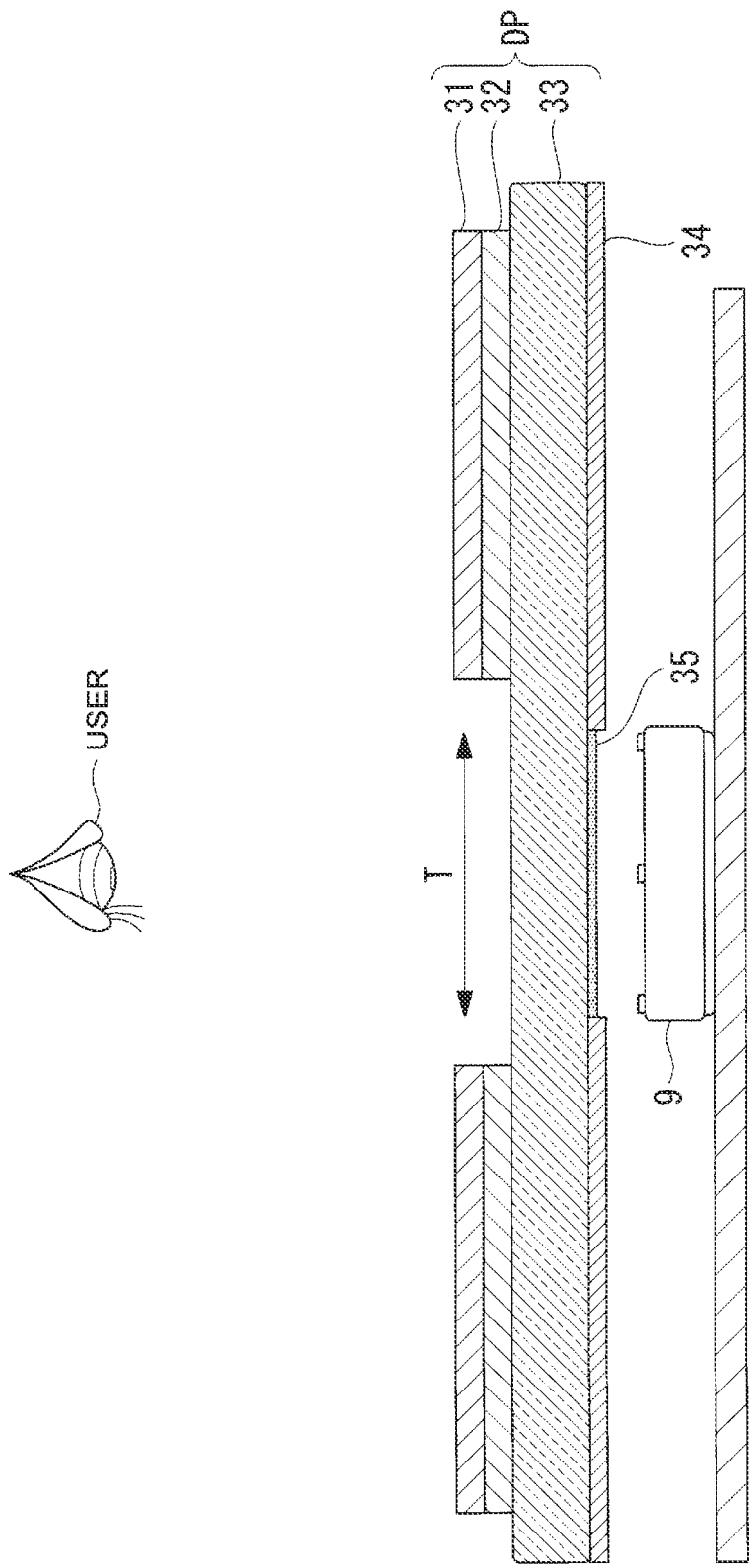
FIG. 3 is a diagram illustrating a configuration example of a display panel according to one embodiment of the present invention.

FIG. 3 is a diagram for explaining the configuration of the display panel DP of the present embodiment. FIG. 3 illustrates a cross-sectional view of the display panel DP. The glass 33 of the display panel DP is provided on a front surface (display surface) of the display unit 5 as a transparent member. That is, the sensor 9 etc. is disposed behind the glass 33 (on the inside of the display-side chassis 3 with respect to the glass 33). Light emitted from the sensor 9 is emitted (irradiated) through the glass 33 to the front surface side of the display (user side). The glass 33 of the display panel DP is disposed most close to the user who looks at the display unit 5.

As illustrated in FIG. 3, the display panel DP is composed of the glass (transparent member) 33, a water-repellent layer (an AF (Anti Finger) layer) 31, a reflection suppressing layer (an AR (Anti Reflection) layer) 32, and a blocking layer (an IR (infrared) layer) 35. In the following description, the water-repellent layer is referred to as the AF layer 31, the reflection suppressing layer as the AR layer 32, and the blocking layer as the IR layer 35.

The AF layer 31 is a layer that is formed in an area other than a certain area including a passing area T of light emitted from the sensor 9 on a surface of the glass 33 opposite to a surface facing the sensor 9 and has water-repellency. The passing area T is an area through which the sensor 9 emits light through the glass 33 (an area through which the light of the sensor 9 passes), and corresponds to a position where the sensor 9 is provided. The AF layer 31 is a layer to prevent a fingerprint or stain etc. from adhering to the surface, and has water-repellency. The AF layer 31 is formed on a surface of the display (a surface of the glass 33). The light emitted from the sensor 9 is reflected by the object in the detection range without passing through the AF layer 31.

Since the AF layer 31 is formed in this manner, the light of the sensor 9 can be efficiently emitted and the adhesion of a stain to the glass 33 surface on which the AF layer 31 is formed can be prevented.

Figure 4:
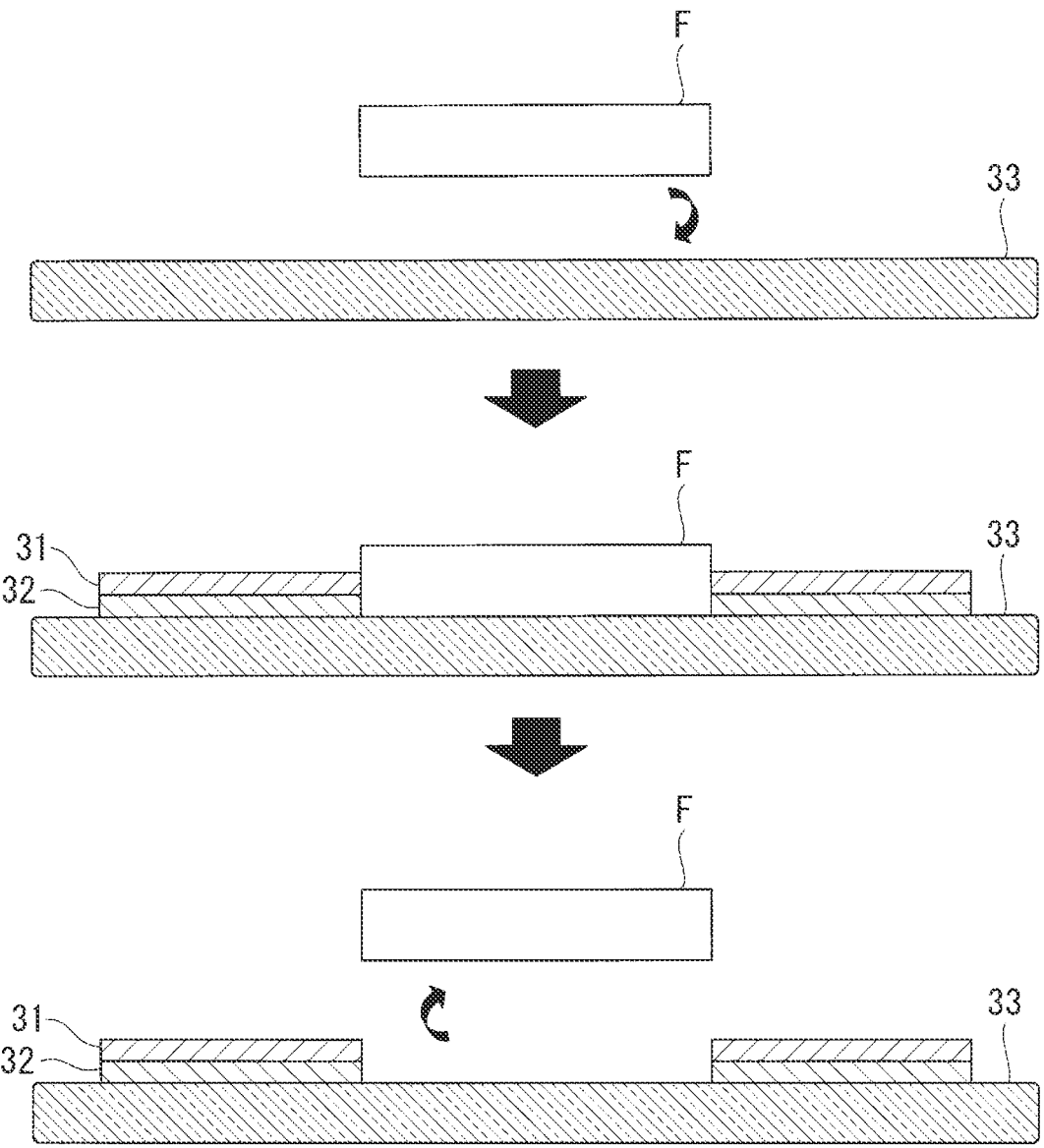
FIG. 4 is a diagram illustrating an example of forming an AF layer according to one embodiment of the present invention.

The AF layer 31 is formed by a procedure as illustrated in FIG. 4, for example. Firstly, at a stage prior to forming the AF layer 31 on the glass 33, a film F is formed in an area that is on the glass 33 and will be the passing area T. The size of the film F is designed to include the passing area T. The AF layer 31 (and/or the AR layer 32) is then formed on the glass 33 by sputtering etc. After the AF layer 31 is formed, the passing area T is then formed in the AF layer 31 by removing the film F from the glass 33. Thus, the AF layer 31 can be formed in an area other than the passing area T on the glass 33. The AR layer 32 mentioned later may be also similarly formed.

The AR layer 32 is a layer that is formed in the area other than the certain area including the passing area T and suppresses reflection. The AR layer 32 is provided between the glass 33 and the AF layer 31. Specifically, the AR layer 32 is a layer that suppresses reflection of the light made incident from the outside of the information processing apparatus 1 in order to prevent reflection of a person or natural light on a display etc.

The AR layer 32 is also formed in the area other than the passing area T at a position corresponding to the sensor 9, on the surface of the glass 33. That is, the light emitted from the sensor 9 is emitted without passing through the AR layer 32. It is to be noted that the AR layer 32 can also be formed in the passing area T. However, the light of the sensor 9 can be emitted more efficiently by no formation of the AR layer 32 in the passing area T.

The IR layer (blocking layer) 35 is a layer that blocks visible light on a surface of the glass 33 opposite to the surface where the AF layer 31 is formed. The IR layer 35 is provided in an area that includes the passing area T. Since the glass 33 is a transparent member, components such as the sensor 9, disposed behind the glass 33, are visually recognized by the user if no processing is done. Thus, the IR layer 35 is provided on the surface (inside surface) of the glass 33 opposite to the surface (outside surface) where the AF layer 31 is formed. The IR layer 35 is a layer that transmits light having a frequency band corresponding to the light to be emitted from the sensor 9 and blocks visible light. The IR layer 35 is also provided for the passing area T. The provision of the IR layer 35 can thus prevent components inside the chassis from becoming visible through the glass 33.

Then, the IR layer 35 has a surface roughness set to be low. A roughness is an index for expressing smoothness of a surface (surface roughness) of a layer. The roughness is expressed as an arithmetic average roughness. It is to be noted that the roughness can be expressed as an arithmetic average waviness etc.

Since the IR layer 35 is a layer that makes the sensor 9 disposed behind the glass 33 invisible, the light from the sensor 9 must be emitted through the IR layer 35. However, the inventor has earnestly studied and discovered that when the surface of the IR layer 35 (surface facing the sensor 9) is rough, the light emitted from the sensor 9 is reflected by the surface (rough surface) of the IR layer 35. That is, the finding has been obtained that when the surface of the IR layer 35 is rough, the light emitted from the sensor 9 cannot be efficiently emitted to an object. Thus, the surface of the IR layer 35 is preferably designed to have a roughness that is equal to or less than a predetermined value.

Figure 5:
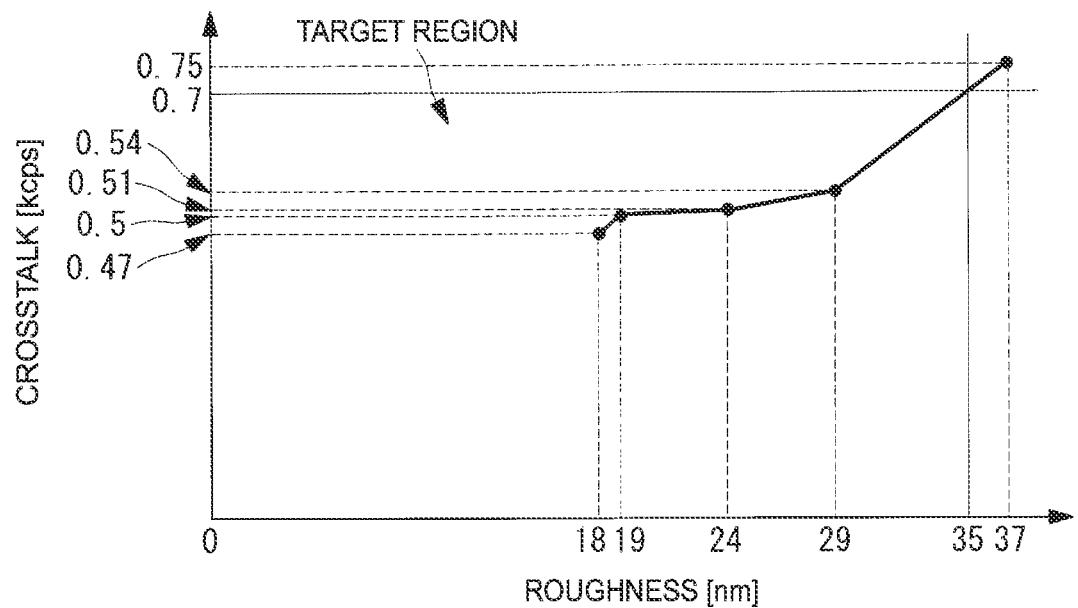
FIG. 5 is a diagram illustrating an example of correspondence of roughness to performance according to one embodiment of the present invention.

The IR layer 35 in general has a roughness that is greater than 35 nm, and about 40 nm, for example. Thus, the IR layer 35 is preferably designed to have a roughness that is equal to or less than 35 nm. FIG. 5 is a diagram illustrating a measurement result when reflectivity (crosstalk) is measured while varying the roughness. The crosstalk is the number of pulses that are reflected within a predetermined time and has a unit of count per second. In FIG. 5, it is illustrated as kilo count per second (kcps). It illustrates that the higher the crosstalk is, the more light is emitted from the sensor 9 and reflected by the IR layer 35. That is, it illustrates that the lower the crosstalk is, the emitted light is less reflected by the IR layer 35 and is released to the outside. As illustrated in FIG. 5, the higher the roughness is, the crosstalk increases. That is, the lower the roughness is and thus the smoother the surface of the IR layer 35 is, the efficiency of the sensor 9 is improved and a favorable result is obtained. FIG. 5 illustrates a graph when the roughness is 37 nm, the crosstalk is measured as 0.75 kcps, when the roughness is 29 nm, the crosstalk is measured as 0.54 kcps, when the roughness is 24 nm, the crosstalk is measured as 0.51 kcps, when the roughness is 19 nm, the crosstalk is measured as 0.5 kcps, and when the roughness is 18 nm, the crosstalk is measured as 0.47 kcps.

Because of this, the IR layer 35 is preferably set within a target region with respect to the characteristics illustrated in FIG. 5. Specifically, an allowable limit of the crosstalk is set to 0.7 kcps and the roughness is set to be equal to or less than 35 nm in the target region. More preferably, the roughness of the IR layer 35 may be equal to or less than 29 nm. More preferably, the roughness may be equal to or less than 24 nm. More preferably, the roughness may be equal to or less than 19 nm. For example, when the IR layer 35 is made by coating a specialized ink, the roughness can be lowered by reducing coating speed.

In addition, a black mask 34 is also provided on the same surface of the glass 33 as the IR layer 35. The black mask 34 is provided in an area (such as a bezel) other than a surface to display and the passing area T. An area in which the black mask 34 is provided is visibly recognized as a black area.

Figure 6:
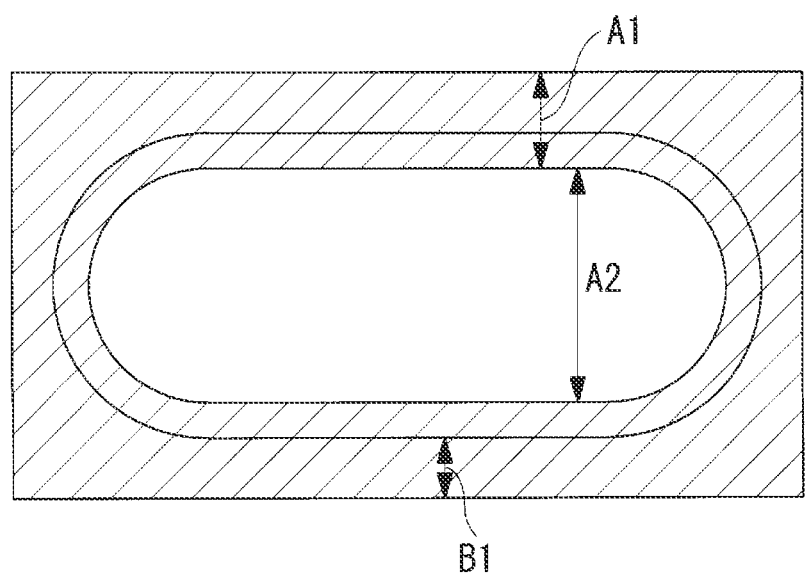
FIG. 6 is a diagram illustrating an enlarged configuration view of a display panel according to one embodiment of the present invention.

FIG. 6 is a plan view illustrating an example of forming a periphery of the passing area T on the glass 33. In an area indicated by A1, the black mask 34 is formed. Then, in an area indicated by B1, the AF layer 31 and the AR layer 32 are formed. Then, in an area indicated by A2, the IR layer 35 is provided. It is to be noted that the area indicated by A2 is the passing area T in FIG. 6.

Figure 7:
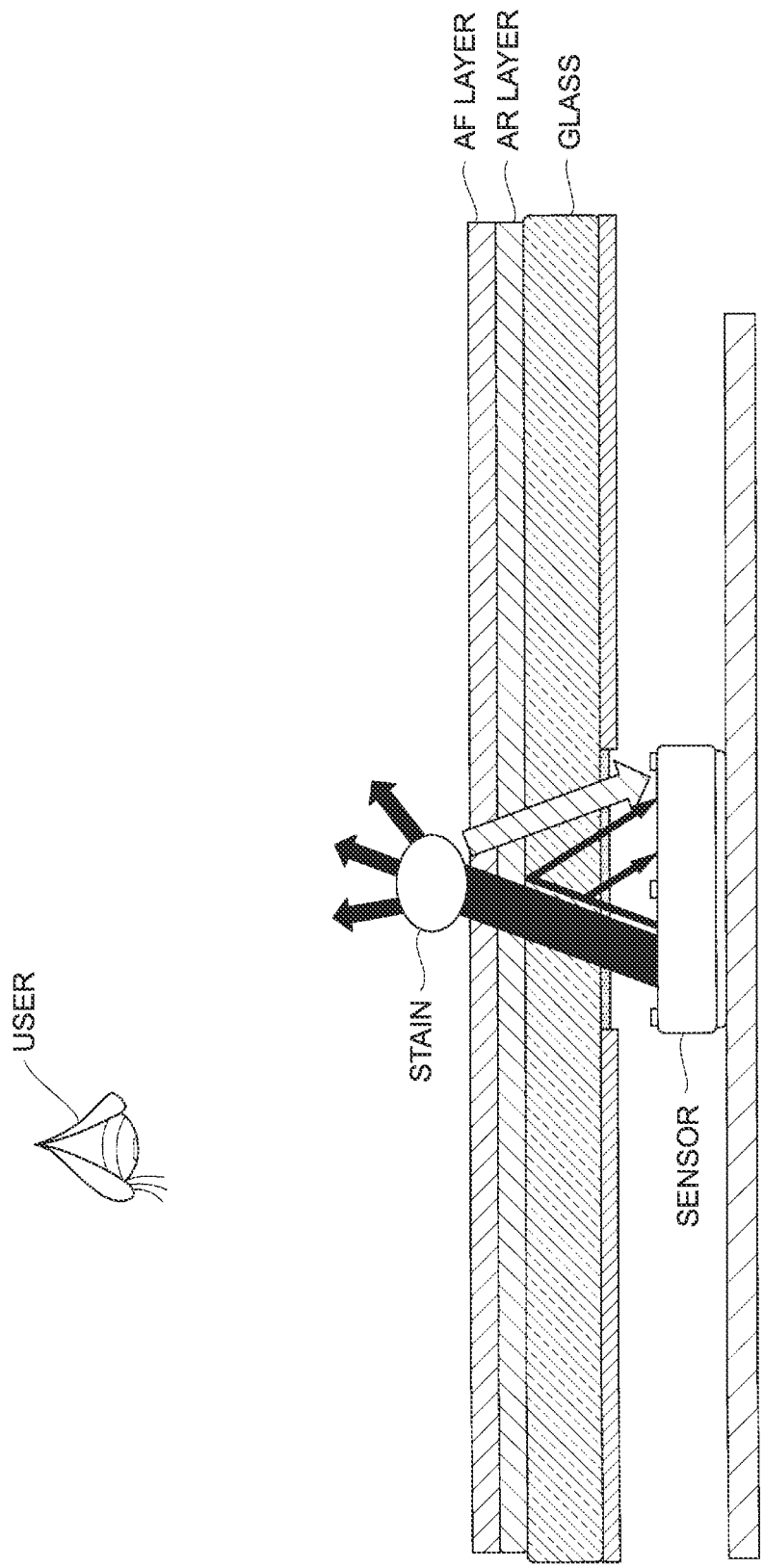
FIG. 7 is a diagram illustrating an example of a light reflection state in a reference example.
Figure 8:
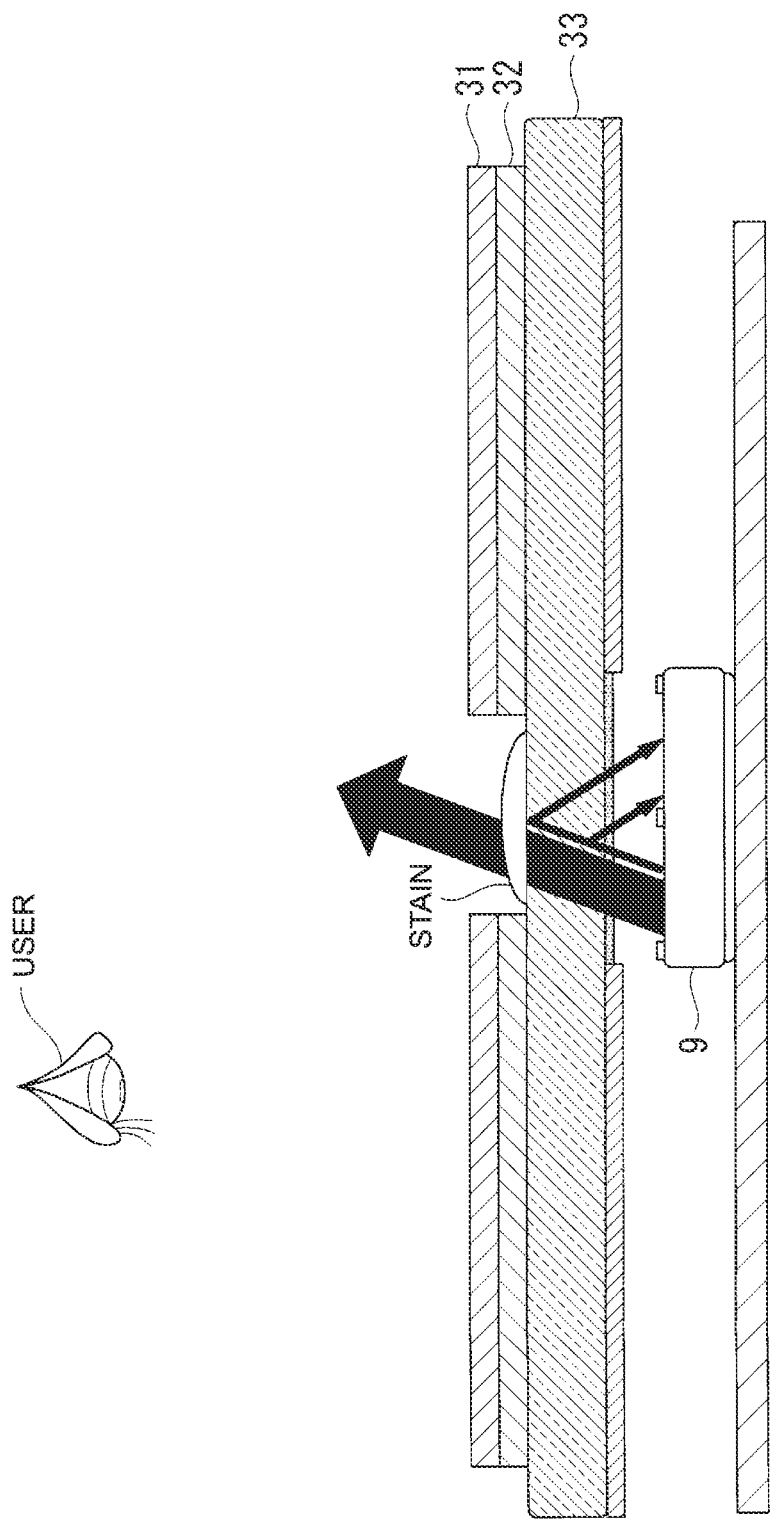
FIG. 8 is a diagram illustrating an example of a light reflection state according to one embodiment of the present invention.

Next, advantageous effects of the structure illustrated in FIG. 3 will be described with reference to FIG. 7 and FIG. 8. FIG. 7 illustrates a light reflection state when the AF layer 31 and the AR layer 32 are provided in the passing area T, as a reference example. FIG. 8 illustrates a light reflection state when the AF layer 31 and the AR layer 32 are not provided in the passing area T, according to the present embodiment.

In the reference example as illustrated in FIG. 7, when a stain (fingerprint) adheres to the passing area T, a contact angle between the stain and the surface becomes large due to the provision of the AF layer 31. Thus, the stain adheres to the surface in a spherical shape. When measurement by the sensor 9 is made in such a state, the light emitted from the sensor 9 is reflected by the stain (irregular reflection). This causes a lot of energy to be reflected, and the energy that passes to be emitted to the front of the display is significantly attenuated. It is to be noted that although reflection occurs in the IR layer 35, the glass, or the AR layer 32, the reflection in the AF layer 31 has a larger influence. In addition, when the emitted light is received, a lot of energy may be reflected by a stain to make it impossible to efficiently receive the light.

In contrast, a contact angle of a stain adhered to the passing area T becomes small by not providing the AF layer 31 in the passing area T, as illustrated in FIG. 8. In such a state, although the light emitted from the sensor 9 is partly reflected by the stain, energy of the reflected light is low. Thus, more energy will be emitted through the glass 33. In addition, when the emitted light is received, it is possible to suppress energy that is reflected by the stain and improve light-receiving efficiency.

The above example indicates the case in which neither the AF layer 31 nor the AR layer 32 is provided in the passing area T. However, since the light is greatly reflected due to the water-repellency by the AF layer 31 as illustrated in FIG. 7, the AF layer 31 may not be provided in the passing area T and the AR layer 32 may be provided therein.

Figure 9:
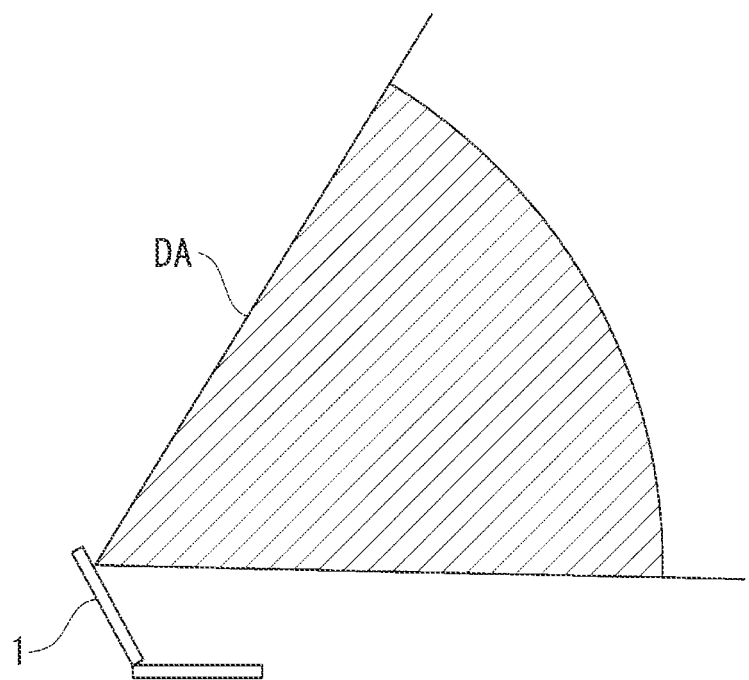
FIG. 9 is a diagram illustrating an example of a detection range of a sensor according to one embodiment of the present invention.
Figure 10:
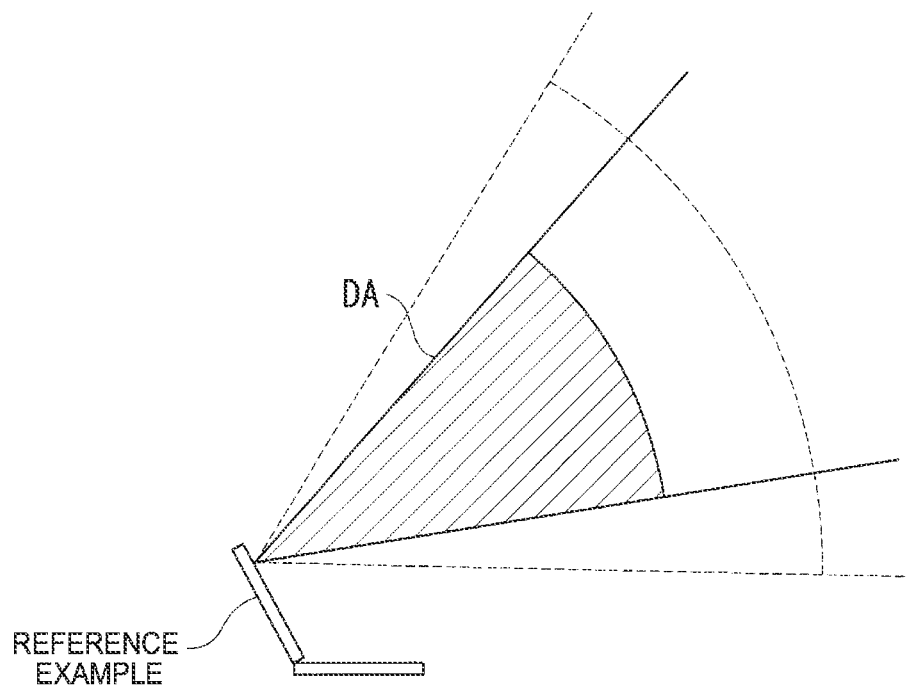
FIG. 10 is a diagram illustrating an example of a detection range of a sensor in a reference example.

Since the energy of the light emitted from the sensor 9 can be effectively passed as illustrated in FIG. 8, a range (detection area) DA that is detectable by the sensor 9, can be widely extended as illustrated in FIG. 9, in the present embodiment. In contrast, when the stain adheres to the passing area T and the energy does not effectively pass through the glass 33 as illustrated in FIG. 7, the range DA detectable by the sensor 9 is narrowed as illustrated in FIG. 10. Even if the detectable range DA is narrowed as illustrated in FIG. 7, it can possibly be extended by increasing the amount of energy to be emitted from the sensor 9. However, since consumption energy increases in this case, battery charge remaining can decrease in battery-powered equipment (such as a laptop PC). In addition, the intensity of light to be emitted from the sensor 9 has to meet the safety standards, such as Laser safety class 1 and so on. Thus, it is not realistic to increase the amount of energy of the light to be emitted, and thus, when the stain is adhered as illustrated in FIG. 7, narrowing of the detectable range DA may occur as illustrated in FIG. 10.

That is, the information processing apparatus according to the embodiment can more effectively maintain the range DA detectable by the sensor 9 while controlling the increase of power consumption.

FIG. 11 is a diagram explaining a relationship between the AF layer 31 and a stain. FIG. 11 expresses evaluation results of respective samples when combining presence or absence of the AF layer 31 in the passing area T and presence or absence of a stain as o, Δ, and x. When the amount of energy emitted through the glass 33, of the energy emitted from the sensor 9, is large, the evaluation result is indicated by o, when the amount of energy emitted through the glass 33 is smaller in comparison to o, it is indicated by Δ, and when the amount of energy emitted through the glass 33 is smaller in comparison to Δ, it is indicated by x.

That is, in a state in which there is no stain, more energy is emitted through the glass 33 both if the AF layer 31 is present and if it is not present, in the passing area T. In a state in which there is a stain, the amount of energy to be emitted through the glass 33 becomes low if the AF layer 31 is present in the passing area T. However, even in the state in which there is a stain, the amount of energy to be emitted through the glass 33 can be improved if the AF layer 31 is not present in the passing area T. That is, not providing the AF layer 31 in the passing area T can prevent the light to be emitted by the sensor 9 from being reflected not to pass through the glass 33, even when a stain adheres.

As having been described above, since the information processing apparatus according to the present embodiment is configured that the AF layer 31 is formed in the area on the glass 33 other than the passing area T through which the light from the sensor 9 is emitted, the light emitted from the sensor 9 is efficiently emitted through the glass 33. In addition, also when reflection light of the emitted light is received, the light can be efficiently received through the glass 33. Thus, it becomes possible to prevent a decrease in detection performance of the sensor 9. In addition, since it becomes possible to efficiently emit, consumption power can be reduced. Furthermore, it becomes possible to prevent the detection range of the sensor 9 from being narrowed due to adhesion of a stain and to prevent a decrease in detection performance of the sensor 9. That is, it becomes possible to efficiently perform detection by the ToF.

The present invention is not limited to the embodiments described above, but various modifications are possible without departing from the sprit and the scope of the invention.

The invention claimed is:

1. An information processing apparatus comprising:
a display panel; and
a ToF sensor emitting light through the display panel,
wherein the display panel comprises:
a transparent member; and
a water-repellent layer in an area of the display panel other than a passing area of light emitted from the ToF sensor on a surface of the transparent member opposite a surface facing the ToF sensor.

2. The information processing apparatus according to claim 1, wherein the ToF sensor emits infrared light.

3. The information processing apparatus according to claim 1, wherein the display panel comprises a reflection suppressing layer suppressing reflection, in the area of the display panel other than the passing area, between the transparent member and the water-repellent layer.

4. The information processing apparatus according to claim 1, wherein the display panel further comprises a blocking layer blocking visible light, in an area of the display panel including the passing area, on a surface of the transparent member opposite to the surface where the water-repellent layer is formed.

5. The information processing apparatus according to claim 4, wherein the blocking layer has a roughness equal to or less than 35 nm.

6. The information processing apparatus according to claim 5, wherein the blocking layer has a roughness equal to or less than 29 nm.

7. The information processing apparatus according to claim 6, wherein the blocking layer has a roughness equal to or less than 24 nm.

8. The information processing apparatus according to claim 7, wherein the blocking layer has a roughness equal to or less than 19 nm.

* * * * *